Jan. 3, 1956  J. PETER  2,729,211
DEVICE FOR EXAMINING THE CONDITION OF THE STOMACH
Filed July 7, 1950
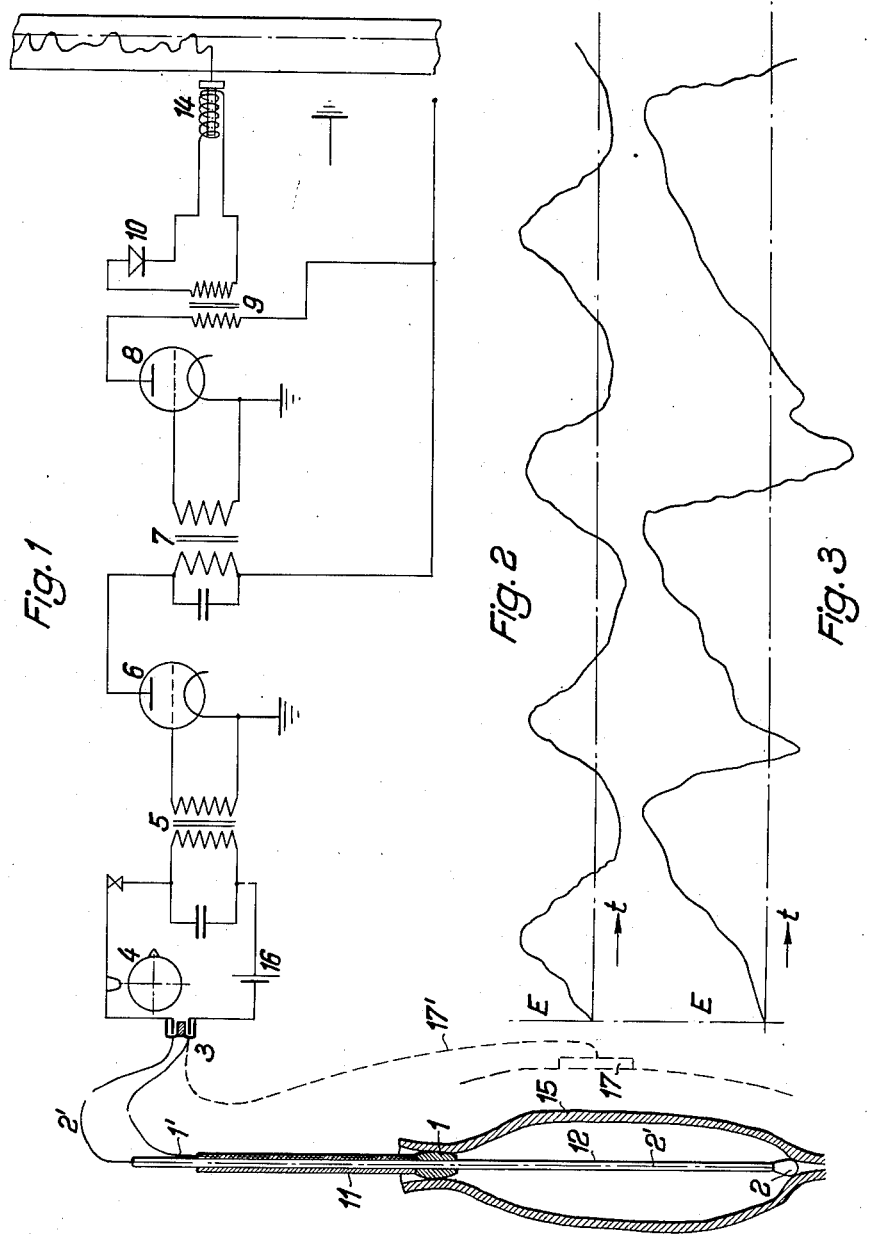
Inventor:
JOSEF PETER
BY
ATTORNEY

United States Patent Office 2,729,211
Patented Jan. 3, 1956

2,729,211

DEVICE FOR EXAMINING THE CONDITION OF THE STOMACH

Josef Peter, Deggendorf (Danube), Germany

Application July 7, 1950, Serial No. 172,404

4 Claims. (Cl. 128—2.1)

The present invention relates to an apparatus for the examination of the stomach by electrical means.

Up to the present, the only method for examining the stomach was by X-ray photography. This method has considerable drawbacks. Not only is the machinery for taking the pictures cumbersome and expensive, but the method also requires lengthy preparations and inflicts most disagreeable procedures on the patient before and while the pictures are being taken. Furthermore, the correct interpretation of the X-rays taken requires long experience.

The present invention makes use of the new medical knowledge that minimum continuous electric tensions are caused by muscular movements.

According to the present invention said continuous tensions are rendered perceptible in their temporal propagation by means of an electric indicator influenced by the same, thereby illustrating the normal or pathological condition of the part of body to be examined.

The direct current obtained will preferably be changed, according to the invention, into interrupted direct current or into alternating current operation on said electric indicator.

It is the object of the present invention to provide an apparatus for examining the stomach, which is simple to handle, reduces the inconvenience for the patient to the attainable minimum and enables the physician to arrive at an accurate diagnosis without expensive apparatus and complicated studies.

It is another object to provide a light-weight portable instrument, easy to take along by the physician which, due to its construction, permits the observation and registration of muscular movements in the stomach over a longer period of time.

Other objects and advantages of the present invention will become apparent from the following detailed description and the accompanying drawing.

Generally speaking, the invention relates to an instrument for recording on an indicating device the pulsations of an electric current effected by muscular movements of the stomach. The device is similar in principle to an electrocardiograph or an encephalograph.

The instrument comprises two electrodes, at least one of which is capable of being introduced into the stomach. In one embodiment of the invention the instrument consists of two electrodes capable of being telescoped while being introduced into the stomach through the esophagus and of being extended when inside the stomach. The two electrodes may be in the shape of probes for palpating the walls of the stomach. The electrodes are connected over a system of electrical devices including an interrupter for converting direct into alternating current to an indicating device, all of which is going to be described more fully with reference to the accompanying drawing.

The frequency of the interrupter or converter is advantageously different from an even multiple amount of the mains frequency. When using an electric converter transforming direct currents into pulsating or alternating currents, there may be inserted in series with this converter a source of direct potential which counteracts the direct potential produced by muscular movement and taken over by means of the electrodes so as to displace the zero line of the pulsating or alternating currents.

The two probe electrodes will preferably consist of the same metal. They may be made, for instance, of silver with a silver-chloride coating, or of nickel. One or each of the two electrodes may be attached to a flexible cable-like support of insulating material to be introduced into the stomach through the esophagus.

According to another embodiment of the invention, only one of the electrodes may be formed as a probe to be inserted into the stomach and the other electrode may have the shape of a plate to be placed on the outside of the body.

In the accompanying drawing,

Fig. 1 diagrammatically illustrates, by way of example, an embodiment of an examining device according to the invention;

Figs. 2 and 3 show graphs on the indicator, Fig. 2 illustrating the movements of a normal stomach, Fig. 3 those of a pathologically changed one.

According to Fig. 1, a periodically operating contact-interrupter 4 and a tuned-up transmitter 5 are connected with two metal electrodes 1 and 2 over the connecting wires 1' and 2' and by means of a transformer with another tube 8 whose anode-potential is recorded on an electric indicator 14 over a transformer 9 and a rectifier 10. If desired, several tubes may be inserted for gradual amplification between the amplifier 7 and the indicator 14. The periodically working circuit-breaker 4 is adjusted to a frequency differing from an even multiple amount of the mains frequency, for example to 270 Hertz or to another odd multiple amount of the mains frequency.

The connecting wire 1' is inserted into the wall of a rubber tube 11 which at its one end carries the shell-shaped electrode 1 which registers with its opening with the tube 11. The conductor 2' is connected to the egg-shaped electrode 2 and enclose by an insulating cover 12 slidably arranged in tube 11 and the shell 1. The exterior diameter of tube 11 is made as small as possible in order to allow the introduction of the two electrodes as probes into the stomach, designated by 15, through the esophagus. Due to the telescoping arrangement of conductor 2' and tube 11, the electrodes 1 and 2 may be placed at controlled distances.

Examination of the stomach is carried out as follows:

Before closing the electrical contact by means of a plug 3, the instrument is introduced through the esophagus so far that the cup-shaped electrode 1 will lie at the stomach entrance (cardia). Then, the conductor 2' with its insulating cover 12 is propelled within the tube until the egg-shaped electrode 2 will have reached the stomach exit (pylorus). Now, the wires 1' and 2' are connected to the periodically working contact-breaker 4 and the transmitter 5 by means of plug 3 so that a closed circuit is established in which the action potentials of 520 millivolts, resulting from the muscular movements of the wall of the stomach, will produce a direct current which is then converted into a pulsating current by the contact-breaker 4. This pulsating current flows over transmitter 5, amplifier 6 and tube 8, and acts, after passing transformer 9 and rectifier 10, upon the indicator.

In order to transform the interrupted direct current produced by the current-breaker 4 into a current passing alternately from above to below the zero-line—i. e., oscillating in the manner of an alternating current about the zero line—there is foreseen in the circuit a source of potential 16 of some millivolts counteracting the potential at the electrodes and displacing correspondingly the zero line of the interrupted direct current toward above.

From findings obtained up to now, it may be seen that the shape of the curve recorded by the electrical indicator clearly illustrates the normal or pathological conditions of the stomach. For instance, every interference with the emptying of the stomach will cause a characteristic alteration in the shape of the curve, and so will other pathological changes.

Fig. 2 shows the curve of the action-potential E of a normal stomach when the probe is introduced for a distance of 70 cm. during the evacuation peristalsis, while Fig. 3 illustrates the curve for a stomach narrowed at its lower orifice and shows the influence of this construction on the course of the currents by the slower rise and the steeper decline of the curve of potential in comparison with the normal curve of Fig. 2.

The application of the device according to the invention is advantageous both for the physician and the patient. The probe-tube may be very thin so that its introduction into the stomach through the esophagus is not too troublesome. Moreover, the patient is relieved from the very disagreeable filling-up of the stomach with bismuth pulp and other similar masses as required for X-ray photography. The physician, on the other hand has an examining device at his disposal which is not only very easy to handle and to be stored away, but which also enables him to make a fast, reliable and thorough examination of the stomach. Finally the instrument is moderately priced and it works without any disturbance As shown in Fig. 1 in broken lines, the one electrode may be formed as a plate electrode 17 which is mechanically independent of the other electrode and connected with a branch line 17'; plate electrode 17 may be placed on the outside of the body and only the second electrode 2 is constructed as probe to be introduced into the stomach In the foregoing I have described and shown the invention by way of illutration and not of limitation and it should be understood that many changes can be made in the design of the electrodes, their arrangement in the means for transforming continuous current into pulsating or alternating current and in many other details without departing from the spirit of the invention.

Wherever in this specification, and in the claims, the expression "varying current" is used, it is intended to comprise a current varying by pulsating above, or by oscillating about, the zero line.

Having now described and ascertained the nature of my said invention, I declare what I claim is:

1. A device for examining the condition of the stomach, comprising in combination two electrodes for palpating the walls of the stomach, electric converting means for transforming direct currents into varying currents, electrical connecting means between said electrodes and said transforming means, an electrical indicator, electrical transferring means for influencing said indicator by the varying currents, and a source of a potential inserted between said two electrodes so as to counteract the continuous potential produced by the muscular movement and thus to displace the zero line of the varying currents.

2. A device for examining the stomach, comprising in combination a flexible tube of insulating material capable of being introduced into the stomach, a shell-shaped electrode having a rounded outside and provided at one end of said tube with an electric wire embedded in the wall of said tube and connected at its one end to said shell-shaped electrode, an egg-shaped electrode, a flexible insulated electric conductor slidably arranged in said tube and in said shell-shaped electrode and connected at its one end with said egg-shaped electrode, means for transforming electric direct currents into varying currents of a frequency differing from an even multiple amount of the mains frequency, means for connecting said transforming means to the other end of said wire and said conductor, respectively, means for amplifying the transformed currents, and indicating means for registering the amplified currents.

3. A device for examining the condition of the stomach, comprising in combination two metallic probes being adapted to be operated by hand for palpating the wall of the stomach and to be connected as electrodes in a circuit so as to receive the electric continuous potential produced by the muscular movements in the stomach; electric means for transforming into varying currents the direct electric currents obtainable by said continuous potential; electric connecting means between said probes and said electric transforming means; an electric indicator registering current variations in the form of curves; and electric transfer means for influencing said indicator by said varying currents.

4. A device for examining the condition of the stomach comprising in combination two telescopically movable metallic probes, one of which at least being adapted to be manually operated for palpating the inner wall of the stomach, and both of them being adapted to receive as electrodes the electric direct potential produced by the muscular movements of the stomach; electric means for converting into varying currents the direct electric currents resulting from said direct potential; electric connecting means between said probes and said electric transforming means; an electric indicator registering current variations in the form of curves; an amplifier connected to said converting means, and electric transfer means for causing recording of the amplified varying currents upon said indicator.

References Cited in the file of this patent

UNITED STATES PATENTS

| | | |
|---|---|---|
| 1,056,336 | Hurdman | Mar. 18, 1913 |
| 1,647,710 | Nichols | Nov. 1, 1927 |
| 1,734,084 | Funck | Nov. 5, 1929 |
| 2,058,761 | Beckman et al. | Oct. 27, 1936 |
| 2,352,011 | Rosa et al. | June 20, 1944 |